(12) United States Patent
Roy et al.

(10) Patent No.: US 8,085,733 B2
(45) Date of Patent: Dec. 27, 2011

(54) WIRELESS COMMUNICATION METHOD AND APPARATUS FOR DYNAMICALLY ADAPTING PACKET TRANSMISSION RATES

(75) Inventors: Vincent Roy, Montreal (CA); Christopher Cave, Candiac (CA)

(73) Assignee: InterDigital Technology Corporation, Wilmington, DE (US)

( * ) Notice: Subject to any disclaimer, the term of this patent is extended or adjusted under 35 U.S.C. 154(b) by 1288 days.

(21) Appl. No.: 11/240,146

(22) Filed: Sep. 30, 2005

(65) Prior Publication Data

US 2006/0187885 A1 Aug. 24, 2006

Related U.S. Application Data

(60) Provisional application No. 60/655,770, filed on Feb. 23, 2005.

(51) Int. Cl.
*H04W 4/00* (2009.01)
(52) U.S. Cl. .................. 370/333; 370/230; 370/253
(58) Field of Classification Search .................. 370/230, 370/253, 333
See application file for complete search history.

(56) References Cited

U.S. PATENT DOCUMENTS

| | | | |
|---|---|---|---|
| 5,546,411 A | 8/1996 | Leitch et al. | |
| 5,706,428 A * | 1/1998 | Boer et al. | 370/342 |
| 6,359,946 B1 | 3/2002 | Ryan | |
| 6,714,551 B1 | 3/2004 | Le-Ngoc | |
| 7,085,228 B2 * | 8/2006 | Zaki et al. | 370/229 |
| 2002/0181637 A1 | 12/2002 | Nakabayashi | |
| 2004/0092232 A1 | 5/2004 | Zeira et al. | |
| 2004/0098652 A1 | 5/2004 | Sternberg et al. | |
| 2004/0242258 A1 * | 12/2004 | Kim | 455/522 |
| 2005/0002330 A1 | 1/2005 | Cave et al. | |
| 2005/0009527 A1 | 1/2005 | Sharma | |
| 2005/0025267 A1 | 2/2005 | Reznik et al. | |
| 2005/0180328 A1 * | 8/2005 | Kim et al. | 370/236 |
| 2005/0286440 A1 * | 12/2005 | Strutt et al. | 370/253 |

FOREIGN PATENT DOCUMENTS

| | | |
|---|---|---|
| EP | 1 492 263 | 12/2004 |
| JP | 2004-297127 | 10/2004 |

OTHER PUBLICATIONS

Goldsmith et al., "Design Challenges for Energy-constrained Ad Hoc Wireless Networks?" IEEE Wireless Communications, vol. 9, issue 4, pp. 8-27 (Aug. 2002).
Goldsmith et al., "Design Challenges for Energy-constrained Ad Hoc Wireless Networks?" IEEE Wireless Communications, vol. 9, issue 4, pp. 8-27 (Aug. 2002).

* cited by examiner

*Primary Examiner* — Jason Mattis
(74) *Attorney, Agent, or Firm* — Volpe and Koenig, P.C.

(57) ABSTRACT

A method and apparatus for use by a first transceiver, (e.g., wireless transmit/receive unit (WTRU), access point (AP), node) for adjusting the transmission rate of packets transmitted to a second transceiver based on signals the first transceiver receives from the second transceiver. In one embodiment, a transmission packet error rate (Tx PER) process is used to adjust the packet transmission rate. In another embodiment, a relative signal strength indicator (RSSI)-based process is used to determine the RSSI of packets received at the first transceiver from the second transceiver for adjusting the packet transmission rate. In another embodiment, transmission quality indicators are measured at the second transceiver and are sent to the first transceiver, which derives a new packet transmission rate therefrom. The Tx PER and RSSI-based processes may be used individually, in combination, or in conjunction with other processes.

22 Claims, 7 Drawing Sheets

WIRELESS COMMUNICATION METHOD AND APPARATUS FOR DYNAMICALLY ADAPTING PACKET TRANSMISSION RATES

CROSS REFERENCE TO RELATED APPLICATION

The present application claims the benefit of U.S. Provisional Patent Application No. 60/655,770 filed Feb. 23, 2005, which is incorporated by reference as if fully set forth.

FIELD OF INVENTION

The present invention is related to data transmission in a wireless communication system. More particularly, the present invention is related to dynamically adapting packet transmission rates in response to varying fading conditions.

BACKGROUND

Wireless communication systems, such as wireless local area networks (WLANs), are well known in the art. Generally, such systems comprise transceivers, (i.e., communication stations, (STAs)), which transmit and receive wireless communication signals between each other. Depending upon the type of system, transceivers may take the form of an access point (AP), a wireless transmit/receive unit (WTRU), a node or the like.

FIG. 1 shows a conventional wireless communication system 10 in which an AP 12 provides communication services to a plurality of WTRUs 14. The AP 12 can communicate with a network 18 through an optional access controller (AC) 16, thereby providing additional network services to the WTRUs 14, such as access to the Internet or a public service telephone network (PSTN). Alternatively, the AP 12 can communicate directly with the network 18 without going through the AC 16.

Ideally, all connections within the system 10 should operate at the highest achievable transmission rate in order to maximize performance and overall system capacity. However, it is not always possible to achieve acceptable quality at higher data rates, since they require relatively higher signal-to-noise ratios (SNRs) at the receiver.

This creates a situation where it would be beneficial to adjust the rate at which packets are transmitted, depending on the SNR conditions that are perceived by a transceiver that receives the packet. However, system 10 does not provide a mechanism to transfer perceived channel quality in terms of received signal power, SNR or packet error rate (PER) to the source of the packets. Thus, the basis for decisions for adjusting the transmission rate of the AP 12 and the WTRUs 14 in the system 10 is limited to local transmission conditions.

SUMMARY

The present invention is related to a method and apparatus for use by a first transceiver, (e.g., WTRU, AP, node or the like), for adjusting the transmission rate of packets transmitted to a second transceiver based on signals the first transceiver receives from the second transceiver. In one embodiment, a transmission PER (Tx PER) process is used to adjust the packet transmission rate. In another embodiment, a relative signal strength indicator (RSSI)-based process is used whereby the RSSI of packets received at the first transceiver from the second transceiver is used to adjust the packet transmission rate. In another embodiment, transmission quality indicators are measured at the second transceiver and are sent to the first transceiver, which derives a new packet transmission rate based on the quality indicators. Optionally, the second transceiver determines a preferred packet transmission rate and sends it to the first transceiver, which adjusts its packet transmission rate accordingly.

Although two different processes, (i.e., a Tx PER process and an RSSI-bases process), for determining a packet transmission rate are disclosed herein, these processes may be used individually, used in conjunction with each other, or used in conjunction with other processes.

In accordance with the present invention, a transceiver selects a preferred data transmission rate from among several available rates, based on measurements made at the transceiver. Those measurements are the received signal strength (Rx power) of packets received at the transceiver, and the Tx PER of signals transmitted by the transceiver, which can be inferred by assuming that a packet is in error every time its corresponding acknowledgment (ACK) is not received from another transceiver. The transceiver can quickly establish the best data transmission rate available while maintaining an acceptable quality of service (QoS). The transceiver can thereafter adapt its transmission rate in response to changing fading conditions.

BRIEF DESCRIPTION OF THE DRAWINGS

A more detailed understanding of the invention may be had from the following description, given by way of example and to be understood in conjunction with the accompanying drawings wherein.

TABLE 1

TABLE OF ACRONYMS

Figure 1:
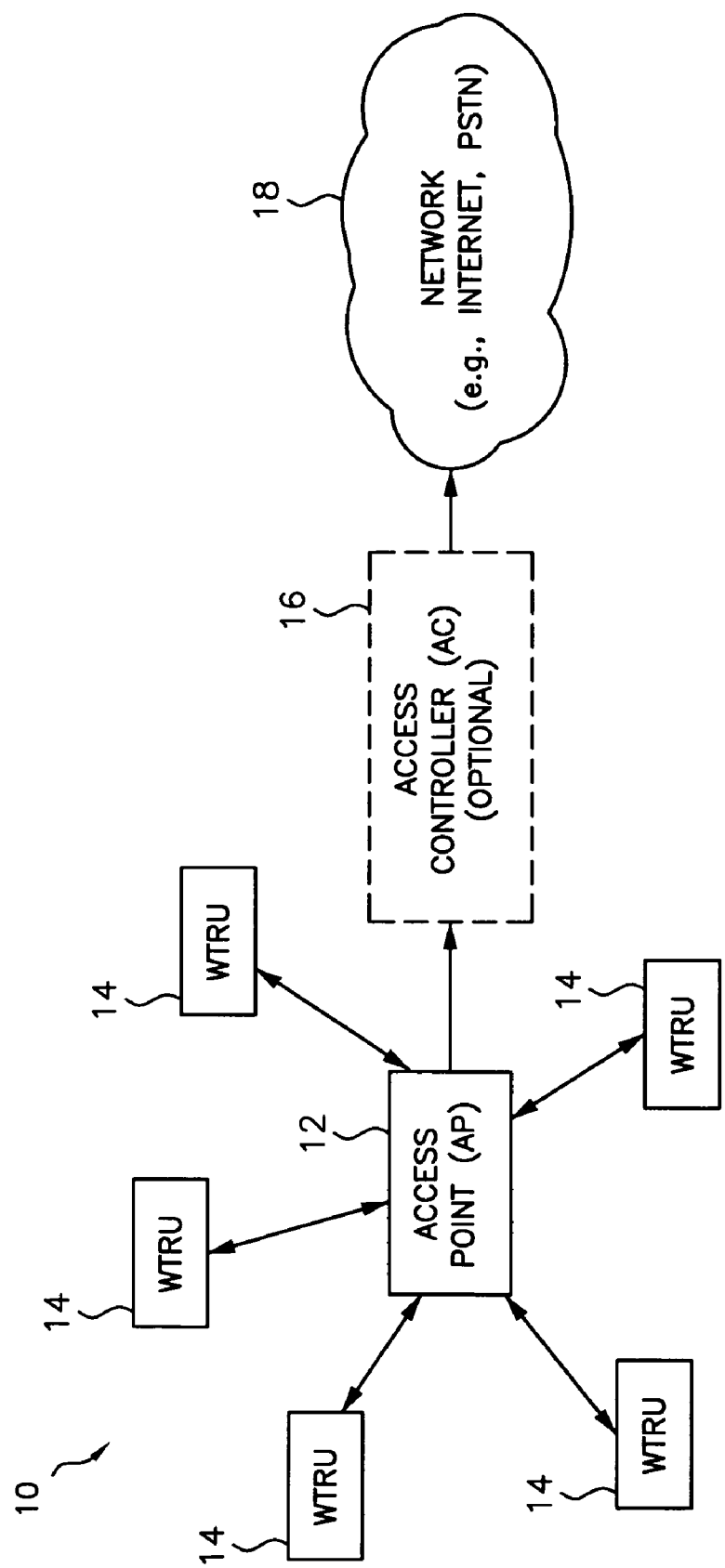
FIG. 1 shows a conventional wireless communication system.

| | |
|---|---|
| ACK | Acknowledgment Signal |
| AP | Access Point |
| BS | Base Station |
| CS | Client Station |
| CTS | Clear to Send |
| MAC | Media Access Control |
| NF | Noise Figure |
| PER | Packet Error Rate |
| Pwr | Power |
| QoS | Quality of Service |
| RSSI | Received Signal Strength Indicator |
| RTS | Request to Send |
| Rx | Receive |
| SNR | Signal-to-Noise Ratio |
| STA | Station |
| STA Tx | Transmitting Station |
| STA Rx | Receiving Station |
| Tx | Transmit |
| TxPwr | Transmit Power |
| WLAN | Wireless Local Area Network |

DETAILED DESCRIPTION OF THE PREFERRED EMBODIMENT

The term AP as used hereinafter includes, but is not limited to, a base station, a Node B, a site controller, a wireless router or any other interfacing device in a wireless environment that provides WTRUs with wireless access to a network with which the AP is associated.

The term WTRU as used hereinafter includes, but is not limited to, a client station (CS), user equipment (UE), station (STA), mobile station, fixed or mobile subscriber unit, pager, or any other type of user device capable of operating in a wireless environment. Such WTRUs include personal communication devices, such as phones, video phones, and Internet ready phones that have network connections. In addition, WTRUs include portable personal computing devices, such as PDAs and notebook computers with wireless modems that have similar network capabilities. WTRUs that are portable or can otherwise change location are referred to as mobile units.

A wireless connection as used hereinafter is defined as a wireless communication between a pair of nodes that can transmit packets to, and receive packets from, each other. Each wireless connection comprises a pair of nodes wherein the roles of the transmitter and receiver of packets are switched back and forth in time between the nodes. For example, a wireless communication system operating in infrastructure mode where two WTRUs are communicating with a single AP consists of two wireless connections. A rate control process should reside in each transmitting node, whose purpose is to determine the optimal rate at which each packet is transmitted for each active wireless connection.

Preferably, the circuitry implementing the various transmitter and receiver functionality described herein may be incorporated on a single integrated circuit, such as an application specific integrated circuit (ASIC). However, the circuitry can also be readily implemented using multiple discrete components, and/or separate integrated circuits.

The specific transmitter and receiver configurations described herein are provided as examples only and not as limitations. Other variations and modifications consistent with the invention will be recognized by those of ordinary skill in the art.

The present invention is a novel apparatus and method that allows a transceiver, (i.e., a WTRU, AP, node), engaged in one or multiple wireless connections to dynamically adapt its transmission rate according to the time-varying propagation conditions of each wireless channel. In order to do so, the present invention relies on two processes to determine a preferred transmission rate, depending upon the availability and validity of certain measurements. In the first process, referred to herein as the Tx PER-based process, the Tx PER is used to determine the best transmission rate. Alternatively, the best transmission rate is determined based on the RSSI or other metric of received packets related to their Rx power, correlated with the Tx PER of transmitted packets. The RSSI is correlated with the Tx PER in a process referred to herein as the RSSI training process. Although the RSSI is used in the description of the preferred embodiment of the RSSI training process, alternative embodiments could use other metrics, such as a SNR.

Figure 2:
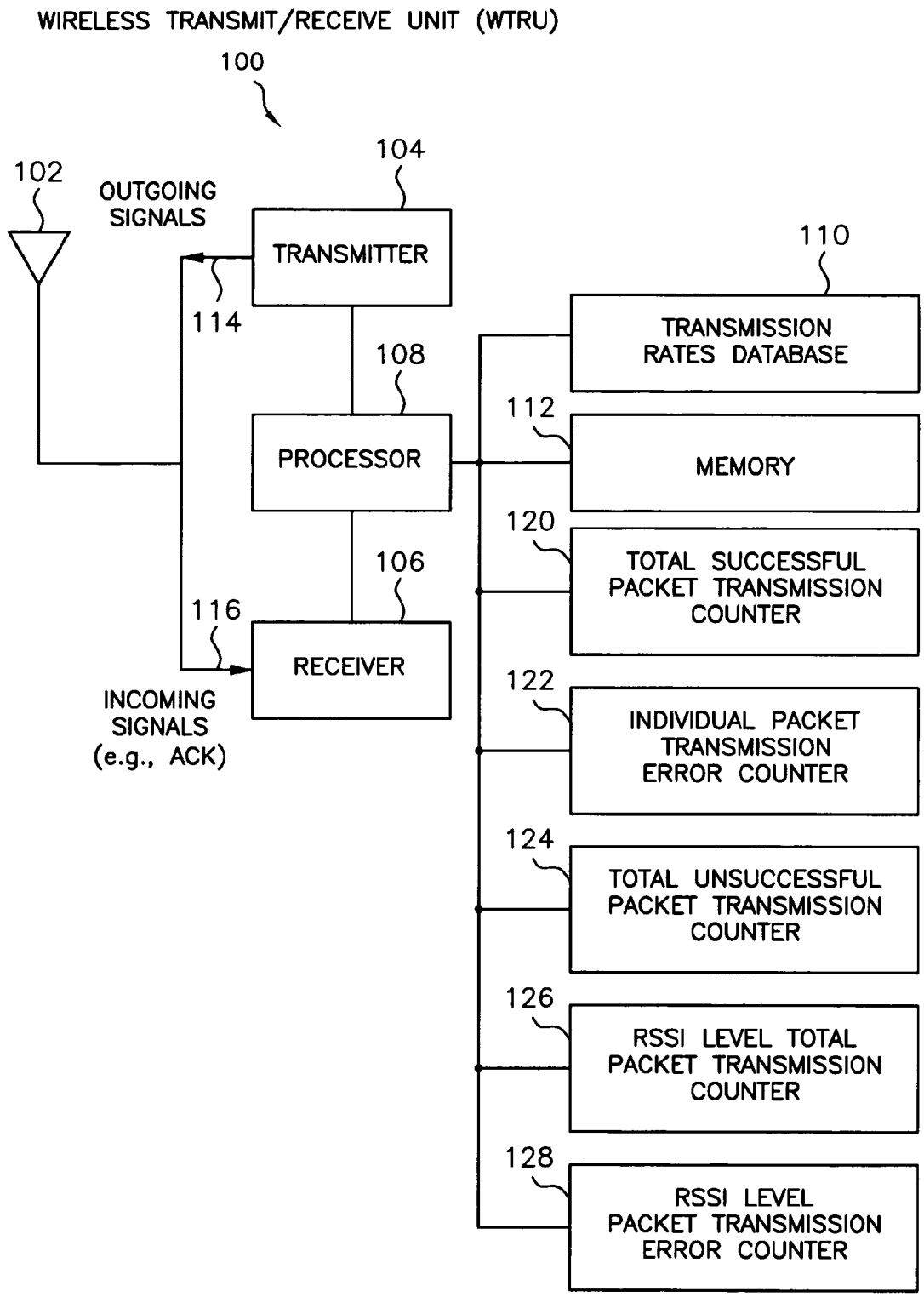
FIG. 2 is an exemplary block diagram of a WTRU configured in accordance with the present invention.

FIG. 2 is an exemplary block diagram of a WTRU 100 configured in accordance with the present invention. The same exemplary configuration disclosed herein for the WTRU 100 may also be incorporated in an AP. The WTRU 100 includes at least one antenna 102, a transmitter 104, a receiver 106, a processor 108, a transmission rates database 110, and a memory 112. The transmitter 104 is configured to send outgoing signals 114 via the antenna 102 at a transmission rate selected from a plurality of available transmission rates, which are stored in transmission rates database 110. The receiver 106 is configured to receive incoming signals 116 from the antenna 102. The processor 108 is coupled to the transmitter 104, the receiver 106, the transmission rates database 110 and the memory 112. The processor 108 selects a transmission rate from the transmission rates database 110 and changes the current transmission rate of the transmitter 104 to the selected rate. This selection can be based upon an evaluation of the incoming signals 114, upon an evaluation of both the incoming signals 114 and the outgoing signals 116, or it can be based upon a rate command received at the receiver 106. The memory 112 is used to store data with respect to the incoming signals 116 and/or outgoing signals 114, and/or with respect to rate commands received at the receiver 106. The processor 108 is configured to process the data stored in the memory 112, and store the results of the processed data in the memory 112 for future access to select and change the transmission rate of the transmitter 104.

The WTRU 100 further includes a plurality of packet transmission counters including a total successful packet transmission counter 120, an individual packet transmission error counter 122, a total unsuccessful packet transmission counter 124, an RSSI level total packet transmission counter 126, and an RSSI level packet transmission error counter 128. The functions of the packet transmission counters 120, 122, 124, 126 and 128 may be implemented by one or more of a database, a processor, software, or the like, on an individual basis or as a maintained set. For example, a plurality of sets of the packet transmission counters 120, 122, 124, 126 and 128 and associated measurements may be maintained to individually control the packet transmission rate associated with each STA, AP, WTRU or the like that the WTRU 100 communicates with over a particular communication link.

Before describing the processes implemented by the present invention, it is advantageous to define several terms, as listed in the following table, Table 2. Although the processes of the present invention will be described in these terms, it should be understood that it is not necessary to employ these terms; rather, the terms are simply a convenient way to describe aspects of the processes. In an implementation, parameters can be stored in memory and updated as needed, or can be maintained and updated in any appropriate manner.

TABLE 2

| Parameter | Description | Example |
| --- | --- | --- |
| Maximum Duration | The maximum duration for which a measurement or command from the node to which the transmitter is sending a packet is valid. The Maximum Duration parameter should preferably be representative of the coherence time of the channel. The received packet can be any type, (e.g., DATA, ACK, RTS, CTS, or the like). | 100 ms |

TABLE 2-continued

| Parameter | Description | Example |
|---|---|---|
| Allowable Rates | A list of the rates a transmitter is able to support, sorted in ascending order. The Allowable Rates can be represented by a vector stored in a memory, wherein each position of the vector corresponds to a particular rate. | [6, 9, 12, 18, 24, 36, 48, 54] Mbps for IEEE 802.11 a |
| Default Rate | The rate that should be used by the transmitter when rate control is initialized. This can be represented by the initial index of an Allowable Rates vector. | 8 (indicates the default rate is the 8th highest supported rate, e.g., 54 Mbps in an 802.11 a system) |
| Current Rate | The rate to be used by the transmitter to send the next packet. This can be represented by the current index of an Allowable Rates vector. | 5 (indicates the next packet will be transmitted at the 5th highest supported rate, e.g., 24 Mbps in an 802.11 a system) |
| Maximum Rate Index | The number of different transmission rates supported. | 8 |
| Rate Down Trigger | A predetermined pattern or plan of adjusting the transmission rate in response to successive transmission errors which indicates, for each retransmission attempt, if the transmission rate should be decreased, and if so by how many rate levels it should be decreased. The pattern can be stored as a vector. For example, in an IEEE 802.11 a system, [0, 0, 1, 1, 2, 2, 1, 0] means that a WTRU operating at 54 Mbps would not decrease its transmission rate until the third retransmission (i.e., after three errors), at which time the transmission rate would be decreased by one level to 48 Mbps. If an error results, the rate would be decreased by one more level at the fourth retransmission to 36 Mbps, and thereafter by decrements of two levels for the 5th (to 18 Mbps) and 6th retransmissions (to 9 Mbps), and then by one level (to 6 Mbps, the lowest supported rate). | [0, 0, 1, 1, 2, 2, 1, 0] |
| Rate Increase Ratio | The maximum allowable ratio of unsuccessful to successful packet transmissions. | 0.10 |
| Packets Needed For Rate Increase | Minimum number of packets which must have been transmitted since the last rate change, in order to permit a transmission rate increase. | 10 |
| Good Packet Count | Number of successful packet transmissions to a particular WTRU. This count is reinitialized to zero after a rate change is implemented. | |
| Bad Packet Count | Number of unsuccessful packet transmissions to a particular WTRU. This count is reinitialized to zero after a rate change is implemented. | |
| Retry Count | Number of unsuccessful transmission attempts for a given packet. This count is reinitialized to zero when the packet is successfully transmitted. | |

Figure 3:
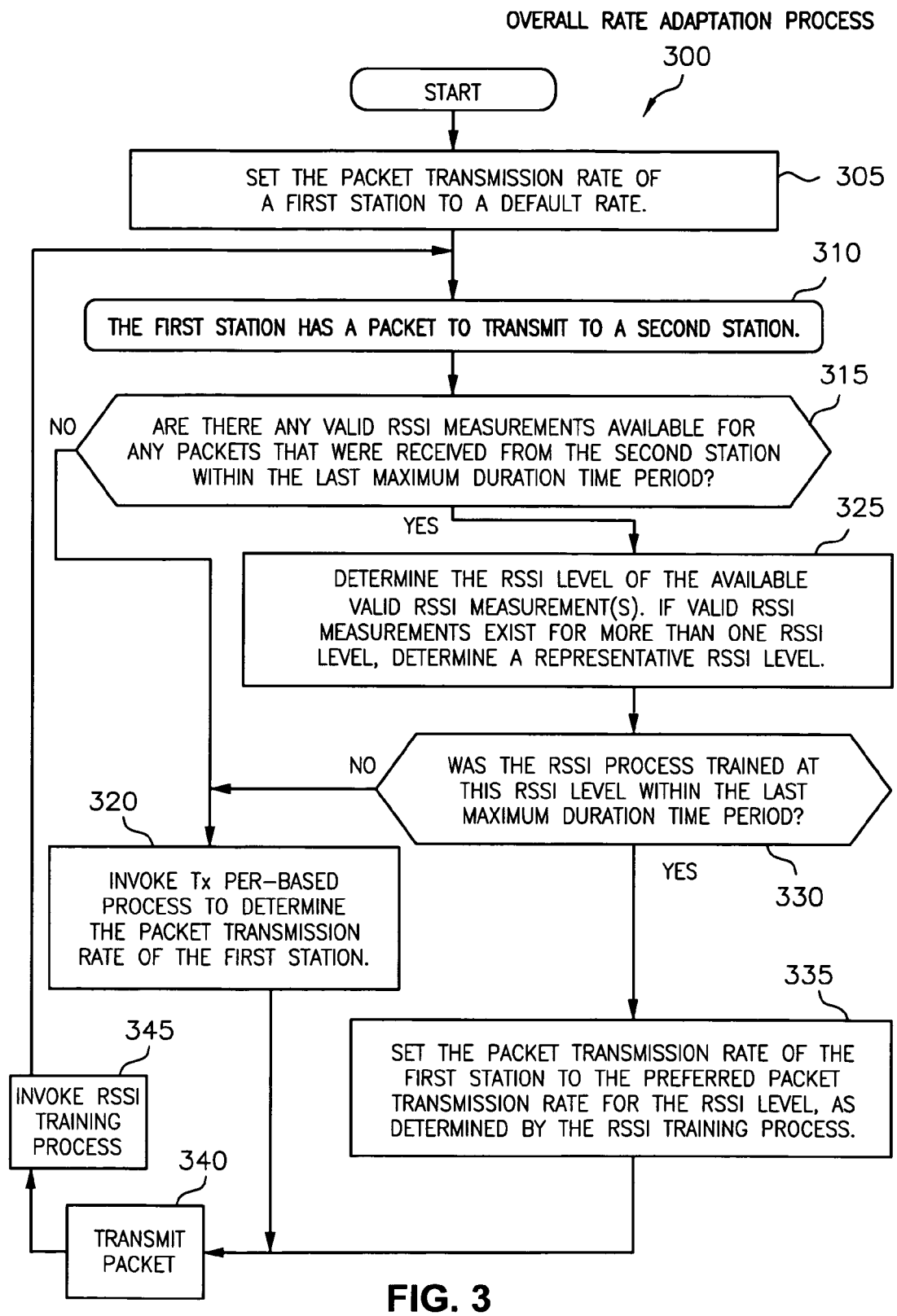
FIG. 3 is a flow diagram of an overall rate adaptation process implemented in accordance with the present invention.

FIG. 3 is a flow diagram of an overall rate adaptation process 300 implemented in accordance with the present invention. The transmission rate is determined using either a Tx PER-based process or an RSSI-based process, implemented by the processor 108 in the WTRU 100 of FIG. 2. The determination of which process to use is based on whether the RSSI-based process has been previously trained, and whether a valid RSSI measurement is available at a particular RSSI level. If so, the RSSI-based process is used to determine the transmission rate. Otherwise, the Tx PER-based process is used. In either case, packets are then transmitted at a rate determined by one of the processes, and the subsequent success or failure of packet transmissions is used to dynamically train the RSSI-based process and to adjust the transmission rate.

A valid RSSI measurement is defined as the RSSI measurement of a packet that was received within a predetermined duration, (herein designated the Maximum Duration), from a node to which the transmitter recently sent a packet. The Maximum Duration is representative of the coherence time of the channel. The received packet can be of any type, e.g., DATA, ACK, RTS, CTS, or the like.

As shown in FIG. 3, the overall rate adaptation process 300 starts when a first station, (i.e., WTRU 100), prepares to transmit a packet for the first time to a second station for the first time by setting the packet transmission rate of the first station to a default rate (step 305). When the first station has a packet to transmit to the second station, (step 310), a determination is made as to whether there are any valid RSSI measurements available for any packets that were received from the second station within the last Maximum Duration time period (step 315).

If no packets were received within the duration period or if no such measurements are available for any received packets, a Tx PER-based process is invoked to determine the packet transmission rate of the first station, (step 320), which will be described in detail hereinafter.

However, if valid RSSI measurements are determined to be available in step 315, a determination of the RSSI level of the available valid RSSI measurement is performed (step 325). If, in step 325, valid RSSI measurements are determined to exist for more than one RSSI level, a representative RSSI level is determined. The representative RSSI level can be based on the most recent RSSI value, or can be a statistic, (such as an average), based on several RSSI values, or based on RSSI values in conjunction with other values. In step 330, a determination of whether the RSSI process has been trained at this RSSI level within the last Maximum Duration time period is made. If so, the packet transmission rate of the first station is set to the preferred rate for that RSSI level, as determined by the RSSI training process, (step 335), the packet is transmitted (step 340) and an RSSI training process is invoked, (step 345). The process 300 returns to step 310 when the first station has another packet to transmit to the second station. The success or failure of transmitted packets is used to dynamically update the preferred transmission rate indicated by the RSSI training process 345, as will be described below after the Tx PER process is described.

If, in step 330, it is determined that the RSSI process was not trained at this RSSI level within the last Maximum Duration time period, the Tx PER-based process is invoked in order to determine the packet transmission rate of the first station, (step 320). The packet is then transmitted (step 340) and an RSSI training process is invoked (step 345).

Figure 4:
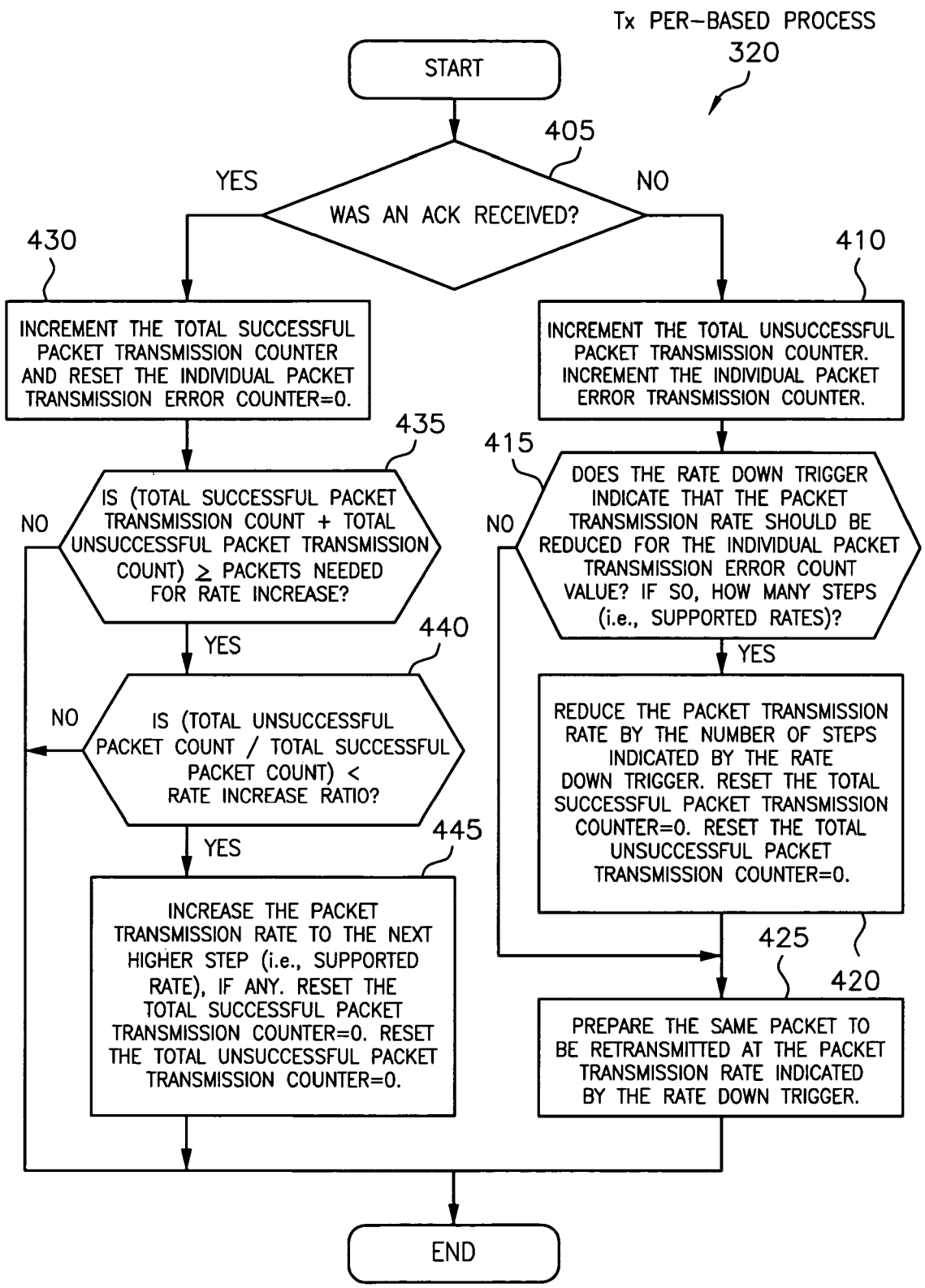
FIG. 4 is a flow diagram of a Tx PER-based process of the overall rate adaptation process of FIG. 3.

FIG. 4 is a flow diagram of the Tx PER-based process 320 of the overall rate adaptation process 300 of FIG. 3. In general, according to the Tx PER-based process 320, the transmitter 104 of the WTRU 100 of FIG. 2 adjusts its packet transmission rate by reacting to transmission events it experiences when transmitting to a receiving node.

If the transmitter 104 of the WTRU 100 of FIG. 2 experiences successive packet transmission errors, its packet transmission rate is reduced according to a predetermined plan or pattern, herein designated as a Rate Down Trigger. The Rate Down Trigger can be a vector stored in the memory 112 in the WTRU 100 of FIG. 2. The Rate Down Trigger indicates, after each successive packet transmission error, whether the packet transmission rate should be reduced before the next packet retransmission attempt, and if so by how much. The indicated rate reduction, if any, is then implemented. The packet transmission rate is reduced in this manner until a packet is successfully transmitted, or until the packet transmission rate is reduced to a predetermined minimum packet transmission rate.

For example, if the WTRU 100 is configured for use in an IEEE 802.11a system, the supported packet transmission rates, sorted in ascending ordered steps, (i.e., levels of supported packet transmission rates), are 6, 9, 12, 18, 24, 36, 48 and 54 Mbps. In that case, a Rate Down Trigger vector of [0,0,1,1,2,2,1,0] indicates that the WTRU 100 would not reduce its packet transmission rate until after third retransmission attempt, (i.e., after three transmission errors for a particular packet), at which point the packet transmission rate would be reduced by one step. Accordingly, if the WTRU 100 is operating at 54 Mbps after a third transmission error, the transmission rate would be reduced by one step to 48 Mbps, and the packet would be retransmitted again. If a transmission error still results, the rate would then be reduced by one more step for the fourth retransmission to 36 Mbps, then reduced by two more steps for each of the 5th (to 18 Mbps) and 6th retransmissions (to 9 Mbps), and then by one step (to 6 Mbps, the lowest supported rate).

If, on the other hand, the transmitter 104 of the WTRU 100 experiences consistently successful transmissions, the transmission rate of the transmitter 104 is increased in accordance with the Tx PER-based process 320. In that case, the transmission rate is increased to the next supported step when the Tx PER experienced by the transmitter 104 drops below a certain threshold for a sufficient number of packets transmitted to a receiving node.

As shown in FIG. 4, if an ACK is received, (step 405), the total successful packet transmission counter 120 in the WTRU 100 is incremented, and the individual packet transmission error counter 122 in the WTRU 100 is reset to zero, (step 430). These counters 120, 122 are used to determine whether the transmission rate should be increased, as will be described hereinafter.

If an ACK is not received at step 405, the total unsuccessful packet transmission counter 124 in the WTRU 100 is incremented, and the individual packet transmission error counter 122 is also incremented, (step 410). The Rate Down Trigger vector is examined to determine if the packet transmission rate should be reduced for the individual packet transmission error count value, and if so, by how many steps, (step 415). If the Rate Down Trigger indicates that the packet transmission rate should not be reduced, the same packet is prepared to be retransmitted. However, if the Rate Down Trigger indicates at step 415 that the packet transmission rate should be decreased by one or more steps, the packet transmission rate is reduced by the number of steps indicated by the Rate Down Trigger, and the total successful packet transmission counter 120 and the total unsuccessful packet transmission counter 124 are reset to zero, (step 420). The same packet is then prepared for retransmission at a packet transmission rate indicated by the Rate Down Trigger, (step 425). The Tx PER-based process 320 may be repeated during a communication session until either the packet transmission rate equals the lowest supported transmission rate, or until an ACK is received.

Requiring successive error events to be experienced before triggering a reduction in transmission rate results in a method that tends to discriminate error events caused by poor signal conditions from error events caused by packet collisions. It also allows a quicker rate reduction reaction time than criteria that consider an average of a number of packet error events, and provides additional transmission rate reductions when an already implemented rate reduction does not result in more reliable communications.

When an ACK is determined to have been received in response to a transmitted packet in step 405, the total successful packet transmission counter 120 is incremented and the individual packet transmission error counter 122 is reset to zero, (step 430). Then, it is determined whether a transmission rate increase is desirable. In general, the proportion of packet transmissions resulting in transmission errors increases as transmission rate increases. The preferred transmission rate is the highest supported rate that can be used while still achieving an acceptable quality of service. The quality of service can be expressed, for example, as a transmission packet error rate, or as the ratio of transmission errors to successful transmissions. A transmission rate increase is thus desirable if the transmitter experiences a lower ratio of transmission errors to successful transmissions than is needed to maintain an acceptable quality of service.

The Tx PER-based process 320 determines if a packet transmission rate increase is desirable by first summing the total successful packet transmission count and the total unsuccessful packet transmission count, (i.e., finding the total number of packet transmissions since transmissions began or since the last packet transmission rate change). This sum is compared to a threshold value, (herein designated as the Packets Needed For Rate Increase), (step 435). The Packets Needed For Rate Increase indicates the minimum number of packets that must have been transmitted since the last packet transmission rate change occurred for a rate increase to be permitted. If the sum is not greater than or equal to the Packets Needed For Rate Increase, no packet transmission rate adjustment is permitted, and the packet transmission rate is not increased.

If the sum of the total successful packet transmission count and the total unsuccessful packet transmission count is greater than or equal to the Packets Needed For Rate Increase, (step 435), the process 320 determines if a rate increase is warranted. A rate increase is warranted if the proportion of transmission failures is less than is allowed to maintain a desired QoS. The proportion of transmission failures can be indicated, for example, by determining the ratio of transmission failures to successful transmissions, or in any other appropriate manner. A packet transmission rate increase is determined to be warranted if the ratio of the total unsuccessful packet transmission count to the total successful packet transmission count is less than what is needed to maintain an acceptable QoS. The ratio needed to maintain an acceptable QoS is a threshold, (herein designated as the Rate Increase Ratio). If the ratio of the total unsuccessful packet transmission count to the total successful packet transmission count is determined at step 440 not to be less than the Rate Increase Ratio, a packet transmission rate increase is not warranted, and the packet transmission rate is not adjusted.

However, if the ratio of the total unsuccessful packet transmission count to the total successful packet transmission count is determined at step 440 to be less than the Rate Increase Ratio, the packet transmission rate is increased to the next higher step, (i.e., the next higher supported packet transmission rate), if one is available, and the total successful packet transmission counter 120 and the total unsuccessful packet transmission counter 124 are both reset to zero, (step 445). During a communication session, the process 25 may be repeated until either the maximum supported transmission rate is reached, or until an ACK is not received.

As communication proceeds between a first station (wherein the invention is implemented) and a second station, the RSSI process is dynamically trained at the first station. When the RSSI process is trained, it is preferably the RSSI process that determines the preferred transmission rate of the first station. The RSSI-based rate adaptation process adapts the packet transmission rate at which packets are sent by the first station to the second station by reacting to variations in the received power of packets received at the first station from the second station. In an exemplary embodiment, the received power is reflected in the measured RSSI of received packets; however an SNR or other metric related to the received power could also be used.

The RSSI-based process dynamically correlates the Tx PER of packets sent by the first station to the second station with the RSSI of packets received at the first station from the second station. This dynamic correlation is referred to herein as training the RSSI-based process. The correlation is done separately for each supported transmission rate used by the first station. It is helpful to divide into discrete levels the expected range of the power of the received signals. For example, if the expected range of received signal power is −97 dBm to −64 dBm, the range can be conveniently divided into levels separated by 3 dBm; e.g., −97 dBm to −94 dBm, −94 dBm to −91 dBm, . . . −67 dBm to −64 dBm, for a total of 12 discrete power levels. Any received power less than −97 dBm can be grouped together into an additional power level, and any received power greater than −64 dBm can be grouped into yet another power level. It should be understood that the range from −97 to −64, the separation of the range into levels separated by 3 dBm, and the number 12 of discrete power levels are used only for illustration, and are not limitations.

The relationship between Tx PER and received packet RSSI is determined by collecting at the first station measurements and information for each packet sent from the first station to the second station and from the second station to the first station. Information collected regarding each packet sent from the first station to the second station includes the transmission rate at which the packet was sent, and whether the transmission was successful, (ACK received), or resulted in a transmission error, (ACK not received). From this information, the Tx PER is calculated at each transmission rate used.

Information collected regarding packets sent from the second station to the first station includes a measure of the signal strength of each received packet, (such as the RSSI), and the time the packet was received. An RSSI measurement is deemed valid only for a length of time designated the Maximum Duration. For RSSI training, it should be noted that all packet types can be used, (i.e. DATA, ACK, RTS, CTS, or the like). If more than one packet is received from the second station within the Maximum Duration period, the process can either use the RSSI from the last received packet, or calculate a statistic, (such as an average), based on several packets. The RSSI measurement of the ACK frame that acknowledged the transmitted packet in the case of a successful transmission is particularly relevant, due to the brief time elapsed between when a packet is sent and an ACK received. Therefore, in a first exemplary embodiment, only the RSSI of the ACK signal is used.

In this embodiment, the RSSI training process relates the RSSI of each ACK received with the transmission rate of the associated transmitted packet which is being acknowledged. If an ACK is received, its RSSI is measured and its RSSI level determined, and the packet transmission is attributed to that RSSI level at the transmission rate used. If no ACK is received, a transmission error is assumed. In that case, if the RSSI process was not used to choose the transmission rate, then the error is not attributed to any particular RSSI level. However, if the RSSI process was used to choose the transmission rate, then the RSSI level used to choose the transmission rate is identified, and the error is attributed to that RSSI level and transmission rate. A running total of the number of packets sent, and the number of transmission errors, is maintained for each RSSI level at each transmission rate. The Tx PER for each RSSI level and transmission rate is calculated by dividing the number of transmission errors by the number of packet transmissions for that RSSI level and transmission rate.

Figure 5:
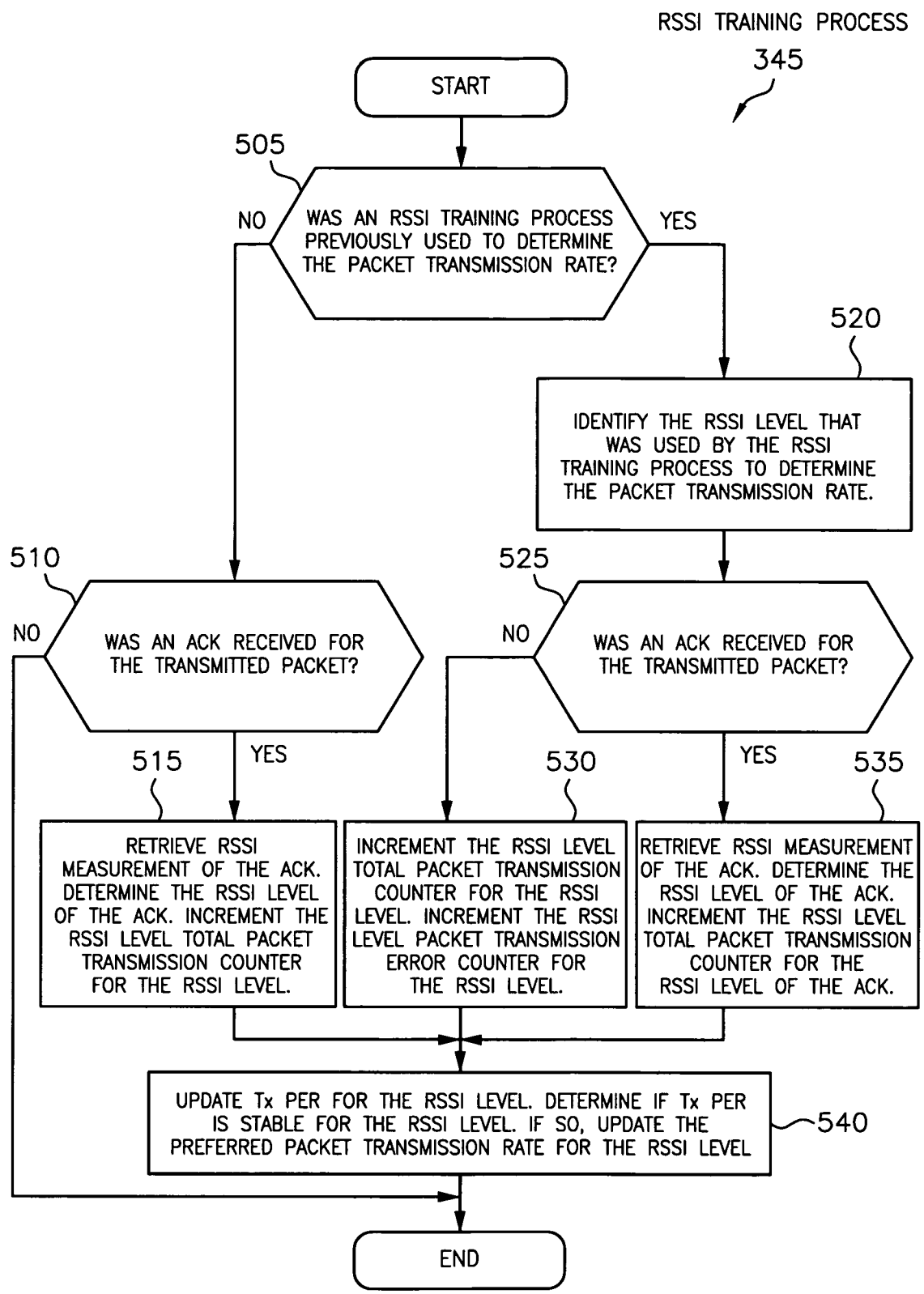
FIG. 5 is a flow diagram of an RSSI training process of the overall rate adaptation process of FIG. 3.

FIG. 5 is a flow diagram of the RSSI training process 345 of the overall rate adaptation process 300 of FIG. 3. The RSSI training process 345 begins after a packet is transmitted, with a determination of whether an RSSI training process was previously used to determine the packet transmission rate, (step 505). If not, a determination is made as to whether an ACK was received in response to a transmitter packet, (step 510). If, at step 510, it is determined that no ACK was received, then there is no way to attribute the transmission error to a particular RSSI level, and the RSSI training process 345 terminates. If, at step 510, it is determined that an ACK was received in response to the transmitted packet, the RSSI measurement of the ACK is retrieved from the memory 112 of the WTRU 100, the RSSI level is determined by the processor 108, and the RSSI level total packet transmission counter 126 is incremented for that RSSI level, (step 515).

If, at step 505, it is determined that the RSSI training process was previously used to determine the packet transmission rate, the RSSI level that was used by the RSSI training process to determine the transmission rate is identified, (step 520). It is then determined whether an ACK was received for the transmitted packet, (step 525). If it is determined at step 525 that an ACK was not received, both the RSSI level total packet transmission counter 126 and the RSSI level packet transmission error counter 128 are incremented for that RSSI level, (step 530). If it is determined at step 525 that an ACK was received, the RSSI measurement of the ACK is retrieved from the memory 112 of the WTRU 100, the RSSI level of the ACK is determined by the processor 108, and the RSSI level total packet transmission counter 126 is incremented for the RSSI level of the ACK, (step 535).

This information is used to calculate the Tx PER at each RSSI level, (step 540) for each transmission rate used. This information could be collected in a table, such as the following table, Table 3, which shows exemplary Tx PER vs. RSSI statistics for each of the transmission rates an exemplary STA uses to transmit packets.

TABLE 3

Tx PER for different Transmission rates

| Rx Power (dBm)<br>(RSSI level) | Rate 1<br>(e.g. 1 Mbps) | Rate 2<br>(e.g. 2 Mbps) | ... | Rate N<br>(e.g. 54 Mbps) |
|---|---|---|---|---|
| −∞ to −97 | 1.00 | 1.00 | ... | 1.00 |
| −97 to −94 | 0.64 | 0.92 | ... | 1.00 |
| −94 to −91 | 0.22 | 0.47 | ... | 1.00 |
| −91 to −88 | 0.07 | 0.18 | ... | 1.00 |
| −88 to −85 | 0.01 | 0.08 | ... | 0.95 |
| ... | ... | ... | ... | ... |
| −70 to −67 | 0.00 | 0.00 | ... | 0.15 |
| −67 to −64 | 0.00 | 0.00 | ... | 0.03 |
| −64 to ∞ | 0.00 | 0.00 | ... | 0.00 |

As shown in FIG. 5, the Tx PER statistic of a given RSSI level and transmission rate is updated accordingly after each new packet transmission (step 540). If a packet was not received properly the first time it was transmitted and it was retransmitted, the second transmission is treated as a distinct packet transmission. In the event of a successful transmission, the database is updated using the RSSI measurement of the ACK frame, either alone or in combination with the RSSI that was used to determine the transmission rate. If multiple valid RSSI measurements are available, either the latest one, or a statistic, (such as an average of two or more of the most recent measurements), can be used to determine the RSSI level. However, it may be advantageous to use the RSSI measurement of the most recently received ACK, because of its close temporal proximity to the transmitted packet.

The RSSI-based process also uses as an input a desired target transmitted PER, or maximum allowed PER. The target transmitted PER can be the same for all transmission rates, or it can be different for different rates. For example, in Table 3, the maximum allowed Tx PER is set at 0.10 for all rates. Thus, the preferred transmission rate at any RSSI level is the highest transmission rate at that level with a Tx PER no greater than 0.10. For such a Tx PER to be valid, there must exist a sufficient number of measurements to establish such a PER.

The minimum number of packets received for an RSSI level that is required to establish a valid Tx PER should be a configurable number. For example, in order to establish a Tx PER no greater than 0.10, at least ten packets must have been received. Alternatively, a Tx PER is preferably deemed stable only after a preferred number of packets have been received equal to a desired multiple of the inverse of the Tx PER. For example, if the desired multiple is two and the target Tx PER value is 0.10 for a particular RSSI level and transmission rate, then in order for the Tx PER value to be deemed stable, at least 2×(1/10)=20 packets must be received at that RSSI level and transmission rate.

In Table 3, the values in bold indicate the preferred transmission rate for each RSSI level. For example, at the RSSI level of −88 dBm to −85 dBm, both Rate 1 (1 Mbps, with a PER of 0.01) and Rate 2 (2 Mbps, with a PER of 0.08) have a Tx PER lower than the maximum allowable value of 0.10. If the next higher rate (not shown) has a PER higher than the maximum allowed (e.g., 0.15) then the preferred transmission rate is Rate 2, which is the highest rate with a PER less than the maximum allowed. In the case where the RSSI is so low (e.g., anything less than −91 dBm in Table 3) that none of the supported rates gives a Tx PER statistic below the maximum allowed PER, then the RSSI-based process should preferably use a flag to indicate that no supported rate results in an acceptable Tx PER. In that case, the packet should not be transmitted, since sending the packet is more likely to result in a transmission error than is indicated by the target or maximum allowed PER. Alternatively, the preferred transmission rate can be set at the lowest supported rate before sending the packet. This information can be summarized as in the following table, Table 4.

TABLE 4

| Rx Power (dBm)<br>(RSSI level) | Preferred Rate |
|---|---|
| −∞ to −97 | None-Flag |
| −97 to −94 | None-Flag |
| −94 to −91 | None-Flag |
| −91 to −88 | Rate 1 |
| −88 to −85 | Rate 2 |
| ... | ... |
| −67 to −64 | Rate N |
| −64 to ∞ | Rate N |

As shown in FIG. 5, after the Tx PER is calculated for an RSSI level and transmission rate, the preferred transmission rate for the RSSI level is also determined as described above, (step 540). After the transmission rate versus RSSI level statistics are obtained and determined to be stable for a particular RSSI level, the RSSI-based process is then used to adjust the transmission rate of a transmitter. Otherwise, the Tx PER-based process is invoked to determine the transmission rate.

Figure 6:
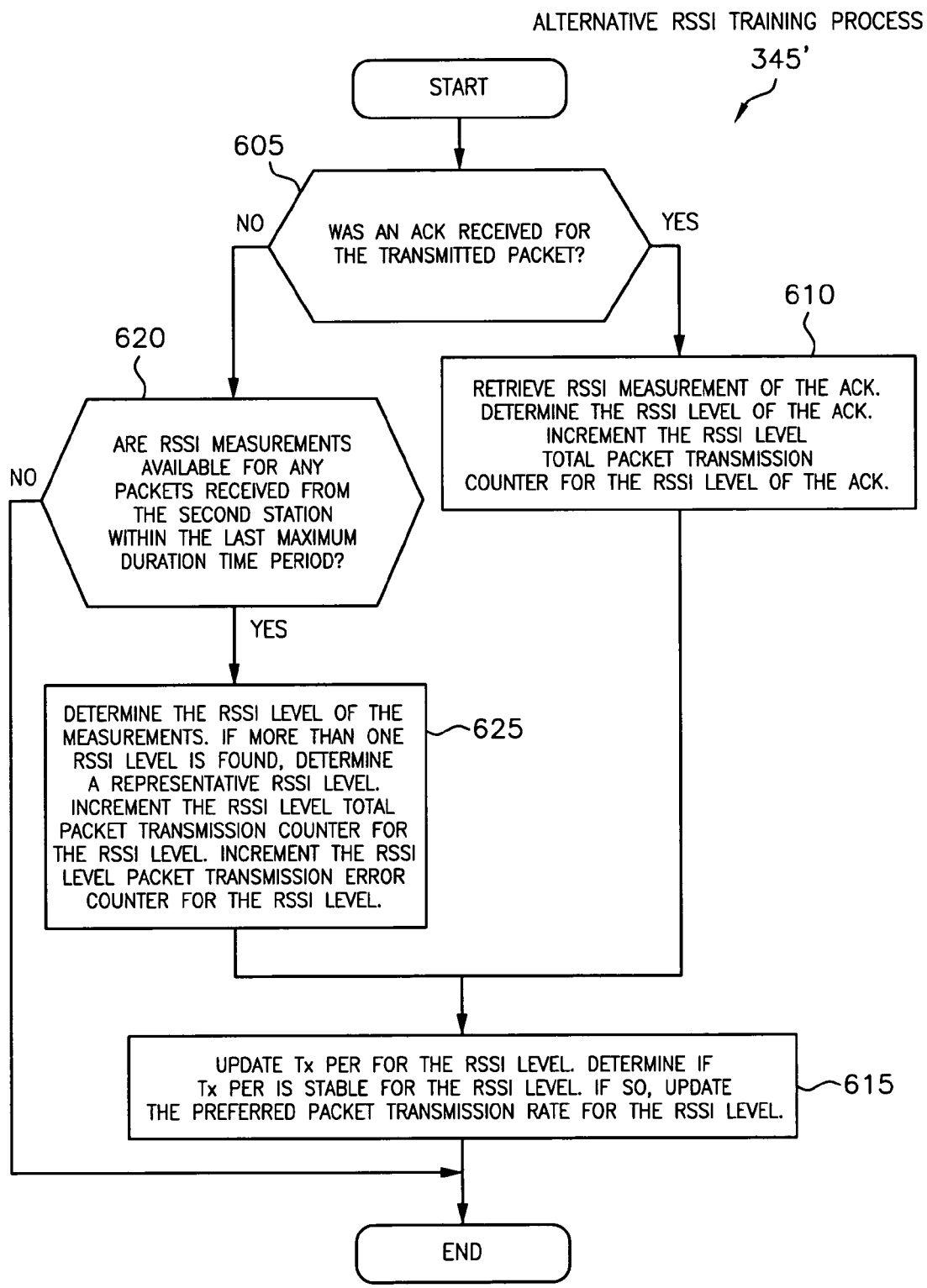
FIG. 6 is a flow diagram of an alternate embodiment of an RSSI training process of the overall rate adaptation process of FIG. 3.

FIG. 6 is a flow diagram of an alternate RSSI training process 345' of the overall rate adaptation process 300 for which it is assumed that the transmitter power and the channel conditions remain substantially constant over time periods substantially equal to the Maximum Duration time period, as is commonly the case.

After a packet is transmitted, a determination is made as to whether an ACK was received for the transmitted packet, (step 605). If so, the RSSI measurement of the ACK signal is retrieved from the memory 112 of the WTRU 100, its RSSI level is determined, and the count of transmissions for the RSSI level is incremented, (step 610). The transmitted packet error rate (Tx PER) is then updated for the RSSI level, a determination is made if the Tx PER is stable for the RSSI level and, if so, the preferred packet transmission rate is updated for the RSSI level, (step 615).

If at step 605 it is determined that an ACK was not received for the transmitted packet, a determination is then made as to whether there are RSSI measurements available for any packets received from the second station within the last Maximum Duration time period, (step 620). If not, then there is no way to attribute the transmission error to a particular RSSI level, and the process 345' terminates. However, if it is determined at step 620 that there are one or more RSSI measurements available, the RSSI level of the measurements is determined. If more than one RSSI level is found at step 625, a representative RSSI level is determined, and the RSSI level total packet transmission counter 126 and the RSSI level packet transmission error counter 128 are incremented for the RSSI level. The Tx PER for the RSSI level is then updated, and a determination is made as to whether the Tx PER is stable for the RSSI level. If so, the preferred packet transmission rate for the RSSI level is updated (step 615).

It should be noted that the RSSI training processes 345 and 345' are ongoing processes. The Tx PER is updated according to FIG. 5 or FIG. 6 at the RSSI level of incoming packets following the transmission of every packet, or alternatively after the transmission of every N packets, even after an RSSI level is deemed "trained". Old statistics may be preferably deleted from the memory 112 after a significant period of time elapses, or using by maintaining in the memory only a preferred number of the most recent measurements, (e.g., 100). Alternatively, the RSSI statistics stored in the memory 112 may be periodically flushed-out whereby the RSSI training process 345 or 345' is restarted from scratch.

Figure 7:
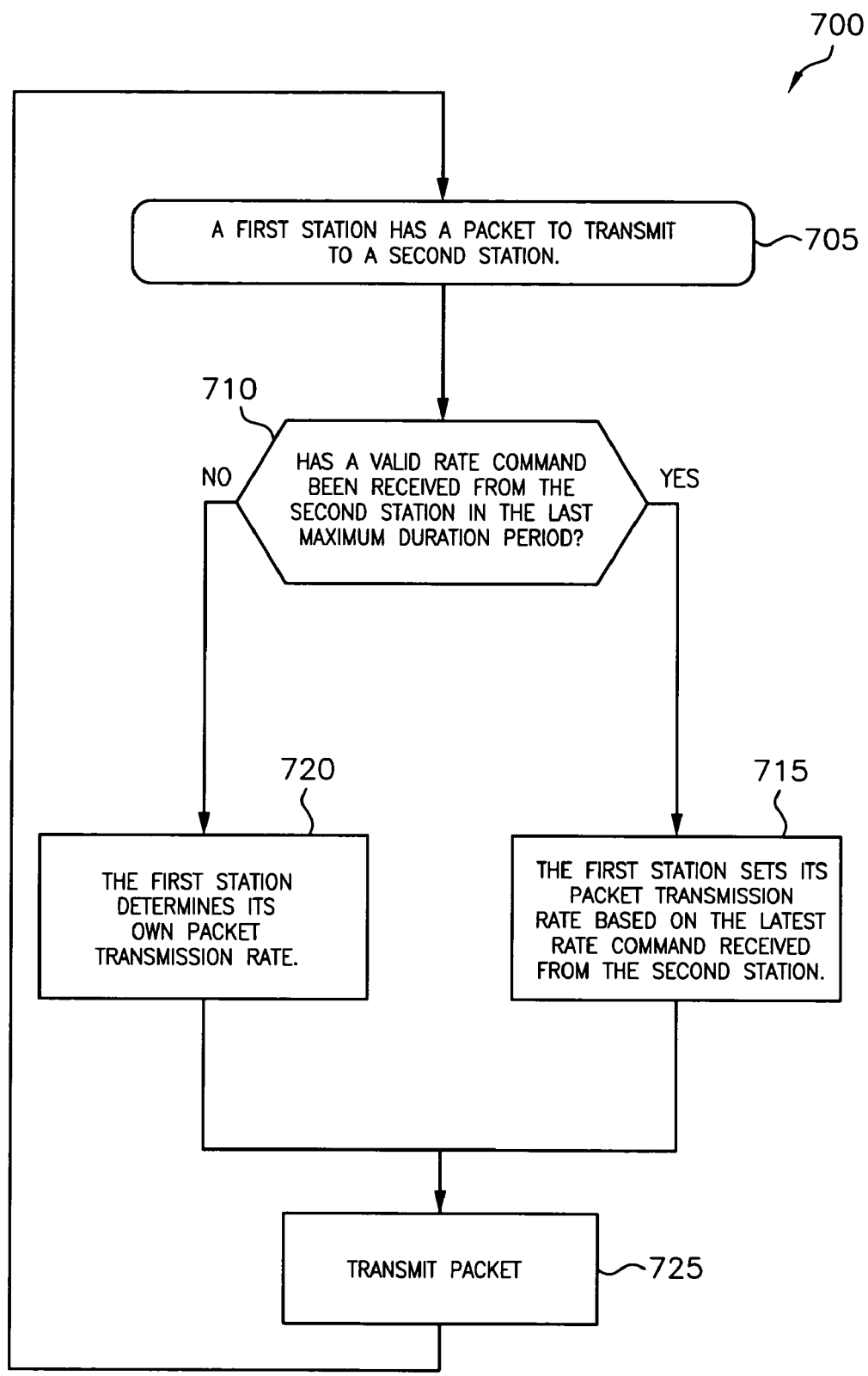
FIG. 7 is an example of an alternative RSSI training process of the overall rate adaptation process of FIG. 3.

In an embodiment of the present invention shown in FIG. 7, a first station transmitting to a second station adjusts its transmission rate in response to a rate command received from the second station. This embodiment involves taking measurements at the second station, determining therefrom a preferred rate, generating a rate command, sending the rate command to the first station, and implementing the preferred rate at the first station. Optionally, the measurements themselves can be sent to the first station, which determines therefrom a preferred transmission rate. The measurements used to determine the preferred rate can include link quality indicators and/or other measurements, such as the RSSI or SNR of signals received at the second station from the first station. The rate command from the second station to the first station is preferably located in a MAC header of a packet sent by the second station to the first station, but it can also be transmitted through other means, such as in a payload of a frame, or in one or more dedicated packets.

This implementation assumes that the second station has stored in memory the sensitivity, (e.g., SNR), needed to achieve a desired QoS, (e.g., PER), for each of the allowed transmission rates. The method by which this information is obtained by the second station can include pre-configuration, training, or the like, and is beyond the scope of this implementation of the invention.

For every packet that the second station receives from the first station, (including packets addressed to nodes other than the second station), the second station measures and stores in a memory the SNR of the packet and the time at which it was received. Thereafter, whenever the second station needs to send a packet to the first station, it checks its memory to see if it has received any packets from the first station within the last Maximum Duration period. If so, the second station generates a statistic from the SNR measurements (e.g. the average SNR of packets received within the last Maximum Duration period, or the most recent valid SNR, or the like) and compares it to the sensitivity figures stored in memory. The preferred rate is the highest rate for which the generated SNR statistic is better than the SNR needed to achieve the desired QoS. The second station then encodes the desired rate into a rate command, which it sends to the first station.

If the second station has not received packets from the first station in the last Maximum Duration period, the second station either sets the preferred transmission rate to a default rate; or to the last rate for which it had successfully received a packet; or to the rate indicated in the last rate command it sent to the first station. Alternatively, it can send a signal indicating the second station is not providing the transmission rate the first station should use, thus leaving to the first station the task of determining its transmission rate. The second station encodes the desired rate or signal into a rate command and sends it to the first station. The first station then stores in memory the latest rate command and the time it was received, and implements it when transmitting to the second station.

FIG. 7 is a flowchart of a rate adaptation process 700 where transmission rate commands are generated at the second station and sent to the first station. When the first station has a packet to send to the second station, (step 705), it checks its memory 112 to see if it has received a valid rate command from the second station in the last Maximum Duration period, (step 710). If so, the first station sets its transmission rate in accordance with the latest rate command received, (step 715). If no valid rate command is available, the first station determines its own transmission rate as described above, (step 720). The packet is then transmitted, (step 725).

Although the features and elements of the present invention are described in the preferred embodiments in particular combinations, each feature or element can be used alone without the other features and elements, or in various other combinations with or without other features and elements of the present invention.

What is claimed is:

1. A method for performing a relative signal strength indicator (RSSI) training process, the method comprising:
    determining a packet transmission rate for transmitting an available packet;
    transmitting the packet at the determined transmission rate;
    performing an RSSI training process based on the transmitted packet;
    based on a condition that an acknowledgement (ACK) message is received in response to the transmitted packet, determining an RSSI level of an RSSI measurement of the ACK message and incrementing a count of total packet transmissions for the RSSI level; and
    based upon the count of total packet transmission ACK messages, updating a preferred packet transmission rate for the RSSI level;
    based on a condition that an ACK message is not received in response to the transmitted packet, increment a count of errors for the RSSI level, update a preferred packet transmission rate for the RSSI level, and adjust the transmission rate for packets by using a vector configured to trigger a rate decrease by a predetermined number of transmission rate levels.

2. The method of claim 1 further comprising:
    determining whether there is at least one valid RSSI measurement available for at least one packet received within a predetermined time period.

3. The method of claim 2 further comprising:
    on a condition that a valid RSSI measurement is available, determining the RSSI level of the at least one available RSSI measurement; and
    determining whether the determined RSSI level was previously used by the RSSI training process within the predetermined time period.

4. The method of claim 3 further comprising:
    setting the packet transmission rate to a preferred packet transmission rate established for the RSSI level, as determined by the RSSI training process.

5. The method of claim 2 further comprising:
on a condition that no valid RSSI measurement is available, performing a transmission packet error rate (PER)-based process to determine the packet transmission rate.

6. The method of claim 3 further comprising:
on a condition that the determined RSSI level was not previously used, performing a transmission packet error rate (PER)-based process to determine the packet transmission rate.

7. A method for managing a packet transmission rate of an access point (AP), the method comprising:
determining a packet transmission rate for transmitting an available packet;
transmitting the packet at the determined transmission rate; and
performing a relative signal strength indicator (RSSI) training process based on the transmitted packet;
on a condition that an acknowledgement (ACK) message is received in response to the transmitted packet, determining an RSSI level of an RSSI measurement of the ACK message and incrementing a count of total packet transmissions for the RSSI level; and
based upon the count of total packet transmission ACK messages, updating a preferred packet transmission rate for the RSSI level;
based on a condition that an ACK message is not received in response to the transmitted packet, increment a count of errors for the RSSI level, update a preferred packet transmission rate for the RSSI level, and adjust the transmission rate for packets by using a vector configured to trigger a rate decrease by a predetermined number of transmission rate levels.

8. The method of claim 7 further comprising:
determining whether there is at least one valid RSSI measurement available for at least one packet that was received within a predetermined time period.

9. The method of claim 8 further comprising:
on a condition that there is at least one valid RSSI measurement available, determining the RSSI level of the at least one valid RSSI measurement; and
determining whether the determined RSSI level was previously used by the RSSI training process within the predetermined time period.

10. The method of claim 9 further comprising:
on a condition that the RSSI level determined was previously used by the RSSI training process within the predetermined time period, setting the packet transmission rate to a preferred packet transmission rate established for the RSSI level, as determined by the RSSI training process.

11. The method of claim 8 further comprising:
based on a condition that there is not at least one valid RSSI measurement available, performing a transmission packet error rate (PER)-based process to determine the packet transmission rate.

12. The method of claim 9 further comprising:
based on a condition that the RSSI level determined was not previously used by the RSSI training process within the predetermined time period, performing, a transmission packet error rate (PER)-based process to determine the packet transmission rate.

13. An access point (AP) for adjusting a packet transmission rate, the AP comprising:
a processor configured to determine the packet transmission rate of the AP;
a transmitter configured to transmit a packet at the packet transmission rate determined by the processor, wherein the processor performs a relative signal strength indicator (RSSI) training process on the packet and determines whether there is at least one RSSI measurement available for at least one packet that was received within a predetermined time period;
based on a condition that an acknowledgement (ACK) message is received in response to the transmitted packet, determine the RSSI level of an RSSI measurement of the ACK message and increment a count of total packet transmissions for the RSSI level; and
based upon the count of total packet transmission ACK messages, update a preferred packet transmission rate for the RSSI level;
based on a condition that an ACK message is not received in response to the transmitted packet, increment a count of errors for the RSSI level, update a preferred packet transmission rate for the RSSI level, and adjust the transmission rate for packets by using a vector configured to trigger a rate decrease by a predetermined number of transmission rate levels.

14. The AP of claim 13 wherein the processor is further configured to, if there is at least one RSSI measurement available for the at least one packet that was received within the predetermined time period, determine an RSSI level of the at least one valid RSSI measurement and determine whether the RSSI level was previously used by the RSSI training process within the predetermined time period.

15. The AP of claim 13 wherein the processor is further configured to, if there is not at least one RSSI measurement available for at least one packet that was received from the other WTRU within a predetermined time period, perform a transmission packet error rate (PER)-based process to determine the packet transmission rate.

16. The AP of claim 15 wherein the processor is further configured to, if the RSSI level was not previously used by the RSSI training process within the predetermined time period, perform a transmission packet error rate (PER)-based process to determine the packet transmission rate.

17. The AP of claim 15 wherein the processor is further configured to, if the RSSI level was previously used by the RSSI training process within the predetermined time period, set the packet transmission rate to a preferred level established for the RSSI level, as determined by the RSSI training process.

18. An integrated circuit (IC) incorporated in a transceiver for adjusting a packet transmission rate of the transceiver, the IC comprising:
a processor configured to determine the packet transmission rate of the transceiver;
a transmitter configured to transmit a packet at the rate determined by the processor, wherein the processor performs a relative signal strength indicator (RSSI) training process on the packet and determines whether there is at least one RSSI measurement available for at least one packet that was received within a predetermined time period;
on a condition that an acknowledgement (ACK) message is received in response to the transmitted packet, determine the RSSI level of an RSSI measurement of the ACK message, increment a count of total packet transmissions for the RSSI level, and based on the count of total packet transmission ACK messages, update a preferred packet transmission rate for the RSSI level;
on a condition that an ACK message is not received in response to the transmitted packet, increment a count of errors for the RSSI level, update a preferred packet transmission rate for the RSSI level, and adjust the transmission rate for packets by using a vector configured to trigger a rate decrease by a predetermined number of transmission rate levels.

19. The IC of claim 18 wherein the processor is further configured to, if there is at least one valid RSSI measurement available for at least one packet that was received from the other transceiver within a predetermined time period, determine a RSSI level of the at least one valid RSSI measurement and determine whether the RSSI level was previously used by the RSSI training process within the predetermined time period.

20. The IC of claim 18 wherein the processor is further configured to, if there is not at least one RSSI measurement available for at least one packet that was received within a predetermined time period, perform a transmission packet error rate (PER)-based process to determine the packet transmission rate.

21. The IC of claim 20 wherein the processor is further configured to, if the RSSI level was not previously used by the RSSI training process within the predetermined time period, perform a transmission packet error rate (PER)-based process to determine the packet transmission rate.

22. The IC of claim 20 wherein the processor is further configured to, if the RSSI level was previously used by the RSSI training process within the predetermined time period, set the packet transmission rate to a preferred level established for the RSSI level, as determined by the RSSI training process.

* * * * *